(12) United States Patent
Campbell et al.

(10) Patent No.: US 9,221,034 B2
(45) Date of Patent: Dec. 29, 2015

(54) PROCESS FOR PREPARING CATALYSTS

(75) Inventors: Graeme Douglas Campbell, Clitheroe (GB); Gordon James Kelly, Darlington (GB); Fiona Mary Campbell, Norton (GB); Brian Peter Williams, Stockton on Tees (GB)

(73) Assignee: Johnson Matthey PLC, London (GB)

( * ) Notice: Subject to any disclaimer, the term of this patent is extended or adjusted under 35 U.S.C. 154(b) by 1284 days.

(21) Appl. No.: 12/446,108

(22) PCT Filed: Oct. 18, 2007

(86) PCT No.: PCT/GB2007/050643
§ 371 (c)(1),
(2), (4) Date: Oct. 12, 2010

(87) PCT Pub. No.: WO2008/047166
PCT Pub. Date: Apr. 24, 2008

(65) Prior Publication Data
US 2011/0034327 A1    Feb. 10, 2011

(30) Foreign Application Priority Data
Oct. 20, 2006    (GB) .................................. 0620793.0

(51) Int. Cl.
*B01J 27/232*    (2006.01)
*B01J 23/80*    (2006.01)
(Continued)

(52) U.S. Cl.
CPC . *B01J 23/80* (2013.01); *B01F 3/12* (2013.01); *B01F 11/0071* (2013.01); *B01J 8/40* (2013.01);
(Continued)

(58) Field of Classification Search
CPC .... B01F 3/12; B01F 11/0071; B01J 37/0009; B01J 37/031; B01J 37/14; B01J 37/16; B01J 2523/12; B01J 2523/17; B01J 2523/22; B01J 2523/27; B01J 2523/31; B01J 2523/8423; B01J 23/80; B01J 23/002; B01J 19/006; B01J 19/243; B01J 35/0053; B01J 35/023
USPC .................................. 502/174, 329, 344, 345
IPC ....................................................... B01J 27/232
See application file for complete search history.

(56) References Cited

U.S. PATENT DOCUMENTS

| 4,522,938 A | 6/1985 | Hoek et al. |
| 4,535,071 A | 8/1985 | Schneider et al. |

(Continued)

FOREIGN PATENT DOCUMENTS

| EP | 0 202 824 A2 | 11/1986 |
| EP | 0 202 824 A3 | 11/1986 |

(Continued)

OTHER PUBLICATIONS

Bowe (EP0449454).*
(Continued)

*Primary Examiner* — Jun Li
(74) *Attorney, Agent, or Firm* — RatnerPrestia

(57) ABSTRACT

A process for manufacturing a catalyst composition comprises the steps of (i) precipitating one or more metal compounds from solution using an alkaline precipitant, preferably comprising an alkaline carbonate, optionally in the presence of a thermostabilizing material, ii) ageing the precipitated composition, and (iii) recovering and drying the aged composition, wherein the ageing step is performed using a pulse-flow reactor.

22 Claims, 1 Drawing Sheet

(51) Int. Cl.
*B01F 3/12* (2006.01)
*B01F 11/00* (2006.01)
*B01J 8/40* (2006.01)
*B01J 19/00* (2006.01)
*B01J 19/24* (2006.01)
*B01J 23/00* (2006.01)
*B01J 37/03* (2006.01)
*B01J 35/00* (2006.01)
*B01J 35/02* (2006.01)
*B01J 37/00* (2006.01)
*B01J 37/14* (2006.01)
*B01J 37/16* (2006.01)

(52) U.S. Cl.
CPC .............. *B01J 19/006* (2013.01); *B01J 19/243* (2013.01); *B01J 23/002* (2013.01); *B01J 37/031* (2013.01); *B01J 35/0053* (2013.01); *B01J 35/023* (2013.01); *B01J 37/0009* (2013.01); *B01J 37/14* (2013.01); *B01J 37/16* (2013.01); *B01J 2219/00777* (2013.01); *B01J 2523/00* (2013.01)

(56) References Cited

U.S. PATENT DOCUMENTS

| | | | | |
|---|---|---|---|---|
| 4,552,861 A | * | 11/1985 | Courty et al. | 502/302 |
| 4,788,175 A | | 11/1988 | Short et al. | |
| 4,863,894 A | | 9/1989 | Chinchen et al. | |
| 5,439,991 A | * | 8/1995 | Colman et al. | 526/64 |
| 5,928,985 A | | 7/1999 | Williams | |
| 2006/0048517 A1 | * | 3/2006 | Fradette et al. | 60/772 |

FOREIGN PATENT DOCUMENTS

| | | |
|---|---|---|
| EP | 0 229 139 B1 | 7/1987 |
| EP | 0 631 809 A1 | 1/1995 |
| WO | WO-95/23644 A1 | 9/1995 |
| WO | WO-02/100924 A2 | 12/2002 |
| WO | WO-02/100924 A3 | 12/2002 |
| WO | WO-2007/071899 A1 | 6/2007 |

OTHER PUBLICATIONS

Stewart ( EP0540180).*

* cited by examiner

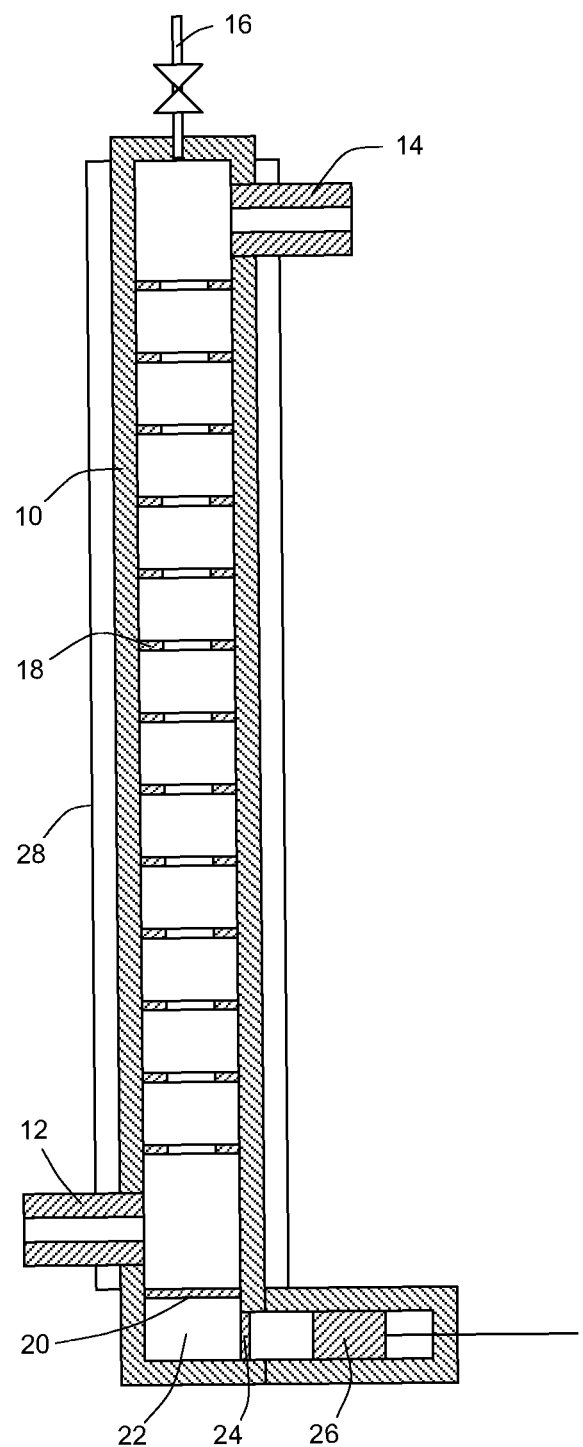

PROCESS FOR PREPARING CATALYSTS

CROSS-REFERENCE TO RELATED APPLICATIONS

This application is the U.S. National Phase application of PCT International Application No. PCT/GB2007/050643, filed Oct. 18, 2007, and claims priority of British Patent Application No. 0620793.0, filed Oct. 20, 2006, both of which are incorporated herein by reference.

FIELD OF THE INVENTION

This invention relates to a process for preparing precipitated catalyst compositions and in particular to the ageing of precipitated catalyst slurries prior to drying and further processing.

BACKGROUND OF THE INVENTION

Manufacturing processes whereby catalyst compositions are precipitated using an alkaline precipitant are known and typically include the steps of forming an aqueous, often an acidic solution of metal compounds, combining the solution with an alkaline precipitant, generally an aqueous solution of one or more of an alkali metal carbonate, alkali metal bicarbonate, alkali metal hydroxide, ammonium carbonate or ammonium hydroxide, to effect precipitation of insoluble metal compounds. The insoluble compounds may be aged for a period in the slurry phase. The aged slurry is then filtered to recover the catalyst composition and dried. Calcination, whereby the dried catalyst composition is heated to elevated temperature to effect a physiochemical change may also be performed. Furthermore, for certain reducible catalyst compositions, for example those comprising Ni, Cu, Co or Fe, the dried or calcined materials may subsequently be exposed to a reducing gas such as hydrogen or carbon monoxide to convert the metal into its elemental or zero-valent state. Subsequent passivation of the reduced catalyst composition may also be performed.

Precipitation is a very rapid process and a subsequent ageing step allows the initially formed precipitate to transform into desired phases and/or morphologies, e.g. a desired crystallite size. Ageing is typically carried out in a batch or semi-continuous procedure whereby the aqueous slurry of precipitated metal compounds is held at elevated temperatures in one or more stirred vessels for selected periods of time. Continuous processes typically employ a number of stirred tanks in series. Such procedures have been used although they can be difficult to control and are therefore prone to give undesirable product variation. Despite this, the development of a suitable single stage continuous process has not been heretofore successful.

SUMMARY OF THE INVENTION

We have found that the use of a pulse-flow reactor in catalyst ageing overcomes the problems associated with prior art processes and offers process intensification by reducing the overall equipment size.

Accordingly the invention provides a process for manufacturing a catalyst composition comprising the steps of
  (i) precipitating one or more metal compounds from solution using an alkaline precipitant, optionally in the presence of a thermostabilising material,
  (ii) ageing the precipitated composition, and
  (iii) recovering and drying the aged composition,
wherein the ageing step is performed using a pulse-flow reactor.

BRIEF DESCRIPTION OF THE DRAWING

The invention is further illustrated by reference to the following drawing in which FIG. 1 is a diagrammatic cross-section of a pulse-flow reactor that may be used to age precipitated catalyst precursors.

DETAILED DESCRIPTION OF THE INVENTION

We have found that using a pulse-flow reactor, the ageing step may be performed in a single stage continuous unit.

Pulse-flow reactors (PFR) are known and generally comprise a elongate, e.g. tubular, vessel having an inlet for reactants at one end, an outlet for products the other end, spaced transverse, sharp-edged baffles or plates arranged along the length of the vessel, or in a helical arrangement, and means to induce a pulsatile motion to material passing through the vessel.

EP 0229139 describes PFR apparatus for mixing a fluid material comprises an elongated vessel to contain the material, means to impose oscillatory motion upon the material in a lengthwise direction, and a plurality of stationary obstacles mounted on the inner wall of the vessel and arranged in sequence lengthwise. The obstacles present sharp ridge-form tips, each ridge pointing in a direction at right angles to that of the oscillating motion. Each adjacent pair of obstacles and the length of vessel wall between them define a zone in which the oscillating motion forms vortices and then ejects those vortices vigorously into the remainder of the fluid outside the trough, so promoting the agitation of that fluid. Hence, the oscillating fluid interacts with each obstacle to form vortices and the resulting motion gives effective and uniform mixing in the zone. As a plurality of these well-mixed zones exist within the vessel, the result is excellent local and global mixing; approaching a plug-flow residence time distribution.

EP 0631809 describes the operation of a PFR for mixing heterogeneous or multiphase systems comprising a continuous phase and at least a solid dispersed phase wherein mixing is carried out by actuating means for pulsing the continuous phase. The PFR was described as being useful for gas phase fluidised bed reactions and gas slurry reactions such as the production of polyethylene from ethylene or solid catalysed reactions such as carbonylation reactions.

These disclosures do not disclose or suggest that such reactors may be useful in catalyst manufacture, let alone that they may be useful in ageing precipitated metal compounds.

In the present invention, one or more insoluble metal compounds are precipitated by combining an aqueous solution of one or more soluble metal compounds, such as a metal nitrate, sulphate, acetate, chloride or the like, and an aqueous solution of an alkaline precipitant. The solutions of metal compound and alkaline precipitant may be combined in any manner known to those skilled in the art of catalyst manufacture. Upon combining the metal solution and precipitant solution, the alkaline precipitant reacts with the soluble metal compound to precipitate insoluble metal compounds such as the metal hydroxide, metal carbonate and metal hydroxycarbonate. The precipitation may be performed at temperatures in the range 0-100° C., preferably 10-90° C. The pH of the combined solution is preferably 6-12, more preferably 8-11.

The precipitated metal compounds are desirably compounds suitable for the preparation of catalysts or catalyst precursors. Hence, the precipitated metal compounds may comprise metal carbonates, metal hydroxycarbonates and metal hydroxides of any of the catalytically active metals found in catalyst or catalyst precursors, including alkali-earth metals, transition metals and non-transition metals. Preferably the precipitated metal compounds comprise compounds of metals selected from Ca, Mg, Ti, V, Ce, Zr, Al, La, Y, Co, Mn, Fe, Cr, Ni, Cu, Zn, or Pb. Mixtures of metal compounds may be present. More preferably the precipitated metal compounds comprise compounds of metals selected from Co, Ni, Cu or Fe, especially Cu and Zn.

It may be desirable, in order to enhance the properties of the catalyst or catalyst precursor, to include with the precipitated metal compound other insoluble components in the catalyst composition and therefore a metal oxide thermostabilising material such as a metal oxide powder, gel or sol may be included or formed during the precipitation of the insoluble metal compounds. Alumina, silica, titania, zirconia and other insoluble metal oxide compounds and/or the corresponding metal hydroxides or hydrated oxides may be present. Metal oxide sols of these oxides are especially useful and a preferred thermostabilising material is an alumina sol. Alumina sol-containing catalyst compositions are described for example in U.S. Pat. No. 4,535,071.

In addition to the catalytic metal compounds and the thermostabilising material the catalyst or catalyst precursor may contain one or more promoters such as an alkali metal compounds, alkali-earth metal compounds, transition metal compounds, rare earth compounds and precious metals such as Ru, Pt or Pd. Preferred promoters in Cu-containing catalyst compositions are compounds of Mg, Cr, Ce, La, Pd, Zr and Mn.

The catalyst or catalyst precursor may contain one or more spinel oxides.

A preferred catalyst precursor composition comprises, prior to calcination or reduction, a solid containing mixed metal hydroxycarbonates, of Cu and Zn, with alumina dispersed therein and optionally containing one or more Mg, Cr, Ce, La, Pd, Zr or Mn compounds as a promoter. The ratio of Cu:Zn atomic ratio is preferably in the range 2:1 to 3.8:1 by weight. The catalyst precursor preferably comprises 30-70% copper (expressed as oxide), 20-90% zinc (expressed as oxide), 5-40% weight alumina and 0.01 to 2.00% by weight of promoter metal. Particularly suitable catalyst and catalyst precursor compositions are described in U.S. Pat. No. 4,788,175.

The alkaline precipitant may be any known precipitant such as alkaline hydroxides, carbonates or hydrogen carbonates, including ammonium hydroxide and ammonium carbonate. Mixtures of alkaline precipitants may be used, for example a mixture of an alkaline carbonate and an alkaline hydroxide. Suitable organic bases may also be used. Preferably the alkaline precipitant comprises an alkaline carbonate. By the term "alkaline carbonate precipitant" we include bicarbonate or metal hydrogen carbonate. The alkaline carbonate precipitant is preferably a carbonate of an alkali metal such as sodium or potassium. Non-carbonate precipitants such as alkali metal hydroxides, e.g. sodium hydroxide or potassium hydroxide, or ammonium hydroxide may be combined with the alkaline carbonate. The concentration of metal carbonate in the precipitant solution may be >25% wt, preferably >30% wt.

Once the metal solution and precipitant solutions are combined and precipitation of insoluble metal compounds has begun, the resulting slurry may be aged. Ageing allows changes in the particle size and morphology to occur and these changes can be desirable in terms of the resulting catalyst physical properties and performance. Carbon dioxide may be evolved from precipitated metal carbonate materials during the ageing process. If desired metal oxide thermostabilising material may be added during the ageing step.

In the present invention, the ageing step is performed in a pulse-flow reactor. While precipitation and ageing may be combined in the pulse-flow reactor it is preferred to have separate precipitation and ageing reactors.

The pulse flow reactor may be an elongate vessel, preferably of circular cross section. A slurry of the freshly precipitated composition and water may be introduced into the vessel from one or more inlets which may be located at either end or at any other point along the length of the reaction vessel, although preferably they are located at one end, e.g. at the bottom (where the reactor is disposed vertically). Correspondingly the vessel is provided with one or more outlets for removing the aged composition, and any evolved carbon dioxide, which may again be located at the opposite end or at any point along the length of the vessel but are preferably at the other end from the inlet, i.e. where the reactor is disposed vertically, at the top end. The vessel is provided with means for imposing on the slurry (i.e. the precipitated composition and water) a pulsatile oscillatory motion in a pre-determined direction, preferably a direction substantially parallel to the direction of fluid flow, and a plurality of stationary baffles mounted substantially traversely to the direction of fluid flow. By imposing an oscillating motion to the material contained in the vessel, the reactants are caused to cross and re-cross the stationary baffles thereby providing vigorous mixing. Such an apparatus is described for example in the aforesaid EP 0229139 and EP 0631809.

The PFR may comprise a single straight section or may comprise a plurality of straight sections joined by U-bends so that the reactor occupies a smaller space. The PFR can be used in a horizontal orientation or a vertical orientation. In either orientation, the reactants enter one end of the reactor, flow along the length of the reactor and emerge at the other end. Carbon dioxide may be recovered through one or multiple outlets disposed on the uppermost surface of the vessel wall. In a horizontal orientation, the baffles in the reactor are suitably spaced from the lowermost inner wall of the reactor to prevent accumulation of solids. Preferably however, the PFR is operated in a vertical orientation as this allows substantially vertical movement of the reactants through the vessel and simplifies carbon dioxide recovery from the vessel.

The internal cross-sectional area of the reactor taken up by each baffle may be the same or different along the length of the reactor but is preferably 20-80%, more preferably 40-60% of the total area. Where the PFR is of circular cross-section, the baffles preferably are perforate discs which may contact the inside wall of the reactor or may be in a spaced relationship with the inside wall of the reactor. Such discs may have one central orifice through which the slurry may pass or may comprise several orifices. Alternatively, the discs may be imperforate and have a smaller diameter than the internal diameter of the vessel thus leaving an annular space around their periphery.

The number of baffles is dictated by the dimensions of the reactor, the desired residence time distribution and the degree of mixing required. Preferably ≥5 baffles are present in the PFR Un-baffled regions may be provided within the PFR if desired to facilitate addition/removal of material to/from the reactor or to facilitate disengagement of any carbon dioxide from the slurry. In particular in a vertical arrangement a disengagement portion is desirable adjacent the one or more outlets of the reactor, especially where the outlets are at the top of the reactor.

The pulsatile flow may be provided by continuously pumping the slurry along the vessel using a centrifugal, diaphragm or gear pump and superimposing reciprocating oscillations by using suitable pumps, valves or other mechanisms such as a piston located so as to constitute an end wall of the reactor, or in hydraulic communication with and end of the reactor. Other mechanical reciprocating devices such as double piston pump may be used. Alternatively a pulsed air leg or other hydraulic means may be used.

The scale of the PFR may suitably be chosen according to the end use. For example, the reactor may have an internal diameter in the range 15 to 4000 mm, preferably 25-1000 mm and a length in the range 0.5 to 5 meters and annular baffles spaced apart by 30-600 mm. Furthermore, the cross-sectional width, e.g. internal diameter, of the PFR may be the same or different along the length of the reactor.

The pulsing or oscillation frequency will depend upon the reactants, the density of each component therein and the viscosity of the system, as well as the degree of mass and heat transfer and mixing required. The pulsing frequency may be 0.1-10 Hz, preferably 1-5 Hz with an amplitude ≥2 mm, preferably ≥5 mm. Preferably the amplitude of the oscillation is in the range 0.05-0.5 times the diameter of the PFR.

The mean flow of the PFR will depend upon the scale of operation as well as particle size of the solid reactants and the slurry concentration. For example the mean flowrate may be in the range 5-50 m³/hr.

The ageing step within the PFR may be performed at temperatures in the range 0-100° C. and at ambient or elevated pressure within the boiling limits of the liquid phase in the slurry. Hence where the liquid phase comprises water, at atmospheric pressure, the reactants may suitably be heated to between 20 and 95° C., preferably 40 and 90° C. using external heating means such as a steam or hot-water jacket. Higher temperatures may be used where the reactants are pressurised.

During ageing some carbon dioxide may be evolved. If desired, this carbon dioxide may be recovered from the ageing step and used to prepare a metal carbonate precipitant.

Once precipitation and ageing steps are completed, the precipitated compositions comprising the insoluble metal compounds may be recovered by filtration, centrifuge or decanting using known methods.

It is preferable to wash the recovered precipitated composition to remove soluble compounds such as soluble metal salts, e.g. Na- or K-nitrates. Washing may be performed using water, preferably de-mineralised water, at ambient, or preferably, elevated temperature. The recovered solids are then further processed into catalyst or catalyst precursor materials.

The further processing of the insoluble metal compounds into a catalyst or catalyst precursor will often include a step of drying the insoluble metal compounds. This may be achieved by heating the damp precipitated material in air or an inert gas to temperatures in the range 25-120° C. in an oven or vacuum oven. The washed catalyst composition may be spray dried using known methods. For example, suitable spray drying methods are described in U.S. Pat. No. 4,522,938.

In one embodiment, the precipitated catalyst compositions comprising the insoluble metal compounds may be further processed by calcining, i.e. by heating them in a calciner to temperatures in the range 200-600° C., preferably 250-400° C. for a period up to 24 hours, preferably up to 8 hours to effect a physiochemical change whereby the precipitated metal compounds are converted into their corresponding oxides.

Where the precipitated compositions include one or more metals selected from Cu, Ni, Co or Fe, they may be further processed by reduction with a reducing gas such as hydrogen or carbon monoxide, or gas mixtures containing these in a reducer. The insoluble compounds may be reduced directly or may be calcined and then reduced. Direct reduction methods are described in U.S. Pat. No. 4,863,894.

Where the catalyst composition comprises Cu, Ni, Fe or Co in reduced form, the high reactivity of the reduced metal with oxygen in air may pose a handling problem due to the pyrophoric nature of the catalysts. It is therefore preferred that such reduced catalyst compositions are passivated. Passivation may be achieved by using inert gas/air mixtures, such as nitrogen/air mixtures, whereby the air concentration is slowly increased over a period in order to generate a thin metal oxide later on the catalyst surface. Alternatively, reduced catalyst compositions comprising one or more of Cu, Fe, Ni or Cu may be passivated using a gas mixture comprising carbon dioxide and oxygen with a $CO_2:O_2$ ratio ≥2:1 in order to form a thin layer of a metal carbonate, e.g. a metal hydroxycarbonate, on the surface. Suitable passivation procedures are described in U.S. Pat. No. 5,928,985.

Preferably the catalyst or catalyst precursor is formed into shaped units such as tablets, pellets, granules or extrudates using known methods. Where the catalyst composition comprises Cu, Ni, Fe or Co, the shaping may be performed before or after any reduction step.

In FIG. 1, a pulse-flow-reactor (PFR) suitable for ageing precipitated catalysts is depicted. The PFR comprises an elongate tubular body 10 in a vertical arrangement, having a slurry inlet 12 adjacent the bottom of the reactor and a slurry outlet 14 adjacent the top of the reactor. A $CO_2$ vent 16 is provided at the top of the reactor. Stationary baffles 18 are disposed evenly within the body 10 along the length of the reactor. Thirteen baffles are depicted, but the reactor may comprise more or fewer baffles as dictated by its size. The baffles 18 are each in the form of a disc having a diameter equal to the internal diameter of the body 10 and supported by support rods (not shown) running the length of the reactor. The baffles 18 have a single central orifice of cross sectional area between 80% and 20% of the internal cross-sectional area of the body 10. At the bottom of the body 10 the end of the reactor comprises a flexible impermeable membrane 20 that imparts oscillatory motion to the slurry passing through the body 10. The body membrane 20 is moved upwards and downwards by a hydraulic fluid 22, which is in turn moved by a flexible pump membrane 24 driven by a piston 26 and motor (not shown). In this embodiment, the pump membrane 24 and body membrane 20 are at right angles, but it will be understood that other configurations are possible. The body 10 of the vessel has an external heating jacket 28 heated by hot water.

In use, the slurry of the catalyst precursor composition, e.g. composition comprising Cu, Zn, Mg and Al according to U.S. Pat. No. 4,788,175, is fed continuously by a pump (not shown) through inlet 12 to the inside of the body 10. The slurry is maintained at elevated temperature by means of the heating jacket 28. By action of the pump, the slurry is passed vertically up through the reactor and leaves the body 10 through outlet 14. As it passes through the body 10, the slurry is subjected to oscillatory motion caused by oscillating membrane 20 and repeatedly contacts the edges of each of the baffles 18. The oscillatory motion is controlled in terms of frequency and amplitude by the piston 26 acting upon the hydraulic fluid 22 and membrane 20. Carbon dioxide is able to disengage from the slurry at the top of the reactor and is vented through $CO_2$ vent 16.

Whereas only single vessel is depicted in FIG. 1, it will be understood that more than one PFR may be used depending upon the scale of catalyst manufacture.

Examples

The invention is further illustrated by reference to the following Examples using a PFR as depicted in FIG. 1 having a length of 1514 mm, an internal diameter of 50 mm, 21 baffles in the form of discs, spaced apart by 72 mm and having a diameter of about 50 mm and a single central orifice of 29 mm diameter. Four parameters (flowrate, slurry temperature, oscillation frequency and oscillation amplitude) were varied as follows;

| Experiment | Flowrate litres/hr | Temp °C. | Freq. Hz | Amplitude mm |
|---|---|---|---|---|
| 1 | 15 | 65 | 3.5 | 10 |
| 2 | 15 | 65 | 1 | 5 |
| 3 | 15 | 45 | 3.5 | 5 |
| 4 | 15 | 45 | 1 | 10 |
| 5 | 5 | 65 | 3.5 | 5 |
| 6 | 5 | 65 | 1 | 10 |
| 7 | 5 | 45 | 3.5 | 10 |
| 8 | 5 | 45 | 1 | 5 |

Each flow condition (in terms of net flow and oscillatory flow) can be described by 3 dimensionless groups: net Reynolds number, $Re_n$; oscillatory Reynolds number, $Re_o$; and Strouhal number, St. These dimensionless groups take the form:

$$Re_n = \frac{\rho U D}{\mu},$$

$$Re_o = \frac{x \omega D \rho}{\mu},$$

$$St = \frac{D}{4\pi x}$$

The values of each dimensionless group for the 8 experiments are given below.

| Experiment | $Re_n$ | $Re_o$ | St |
|---|---|---|---|
| 1 | 149 | 23500 | 0.786 |
| 2 | 149 | 3260 | 1.572 |
| 3 | 149 | 11700 | 1.572 |
| 4 | 149 | 6510 | 0.786 |
| 5 | 75 | 11700 | 1.572 |
| 6 | 75 | 6510 | 0.786 |
| 7 | 75 | 23500 | 0.786 |
| 8 | 75 | 3260 | 1.572 |

A slurry of a catalyst precursor composition comprising Cu, Zn, Mg and Al was prepared according to U.S. Pat. No. 4,788,175. The slurry comprising metal carbonates, including hydroxycarbonates, was passed directly to the PFR, which operated according to the above conditions. Material leaving the PFR was filtered on a vacuum filter pot and washed 3 times with twice its own volume of hot demineralised water. The filtered and washed material was oven dried at 110° C. for 16 hours. Samples of the dried material were characterised by particle size, XRD, ICP, TGA/DSC and copper surface area (CuSA).

The particle size (in μm) of each sample was measured using a Malvern Instruments Mastersizer 2000 laser diffraction unit. The dried sample was re-slurried in demineralised water and then finely dispersed by ultrasonic agitation. The results for each experiment are given below.

| Experiment | $d_{10}$ | $d_{50}$ | $d_{90}$ |
|---|---|---|---|
| 1 | 2.544 | 19.704 | 56.600 |
| 2 | 3.205 | 17.817 | 41.122 |
| 3 | 3.033 | 21.942 | 75.446 |
| 4 | 2.371 | 15.082 | 39.061 |
| 5 | 7.646 | 21.473 | 40.052 |
| 6 | 3.602 | 17.987 | 43.317 |
| 7 | 2.443 | 18.958 | 52.913 |
| 8 | 2.955 | 18.505 | 63.729 |

The crystal structure of each sample was determined by XRD technique using a Siemens D5000 diffractometer. All the samples contained malachite [$Cu_2(CO_3)(OH)_2$] and smithsonite [$ZnCO_3$] phases.

The chemical composition of the samples (in terms of weight percent CuO, ZnO, MgO, $Al_2O_3$, $Fe_2O$ and $Na_2O$) was determined using ICP-Atomic Emission Spectroscopy on a loss free basis. The residual alkali composition was recorded to evaluate the ease by which the sodium ions could be washed from the filter cake taken from the PFR. The chemical composition of the samples (% wt) is given below.

| Experiment | CuO | ZnO | MgO | $Al_2O_3$ | $Fe_2O_3$ | $Na_2O$ |
|---|---|---|---|---|---|---|
| 1 | 68.4 | 24.7 | 1.4 | 5.2 | 0.014 | 0.044 |
| 2 | 63.9 | 24.6 | 2.2 | 9.0 | 0.014 | 0.120 |
| 3 | 64.0 | 24.6 | 2.2 | 8.3 | 0.014 | 0.680 |
| 4 | 58.9 | 24.5 | 3.0 | 12.9 | 0.018 | 0.400 |
| 5 | 65.3 | 25.0 | 1.9 | 7.5 | 0.020 | 0.077 |
| 6 | 55.0 | 25.7 | 3.8 | 15.2 | 0.040 | 0.067 |
| 7 | 54.1 | 24.9 | 3.6 | 16.1 | 0.023 | 1.200 |
| 8 | 64.2 | 25.0 | 2.0 | 7.7 | 0.013 | 0.840 |

The samples were pelletized by passing the dried filter cake through a 1.7 mm sieve and then calcining at 300° C. for 6 hours, or until the weight loss on ignition was 14-18%. The calcined powder was then mixed with 2% w/w graphite and pre-compacted and passed through a 1.4 mm sieve, before being pelleted to a density of 2 g/cm³.

Copper surface areas were determined on the pellets by first grinding them 0.6-1.0 mm, reducing the crushed pellets in a stream of hydrogen and analysing them according the method described in EP202824.

The results were as follows;

| | Copper surface area (m²/g) | |
|---|---|---|
| Experiment | Discharged | Discharged weight ratio |
| 1 | 69.22 | 1.69 |
| 2 | 58.77 | 1.46 |
| 3 | 51.24 | 1.27 |
| 4[a] | 60.45 | 1.47 |
| 5[a] | 60.45 | 1.47 |
| 6[b] | — | — |
| 7 | 49.72 | 1.21 |
| 8 | 52.34 | 1.30 |
| standard[c] | 45.00 | 1.10 |

[a]The samples for Experiments 4 and 5 were combined together.
[b]No result obtained.
[c]Stirred tank ageing at 50-80° C.

The results demonstrate that the PFR ageing is possible and that continuous PFR ageing can provide catalysts with high copper surface areas.

The references discussed herein are hereby incorporated by reference.

The invention claimed is:

1. A process for manufacturing a catalyst composition comprising the steps of
   (i) precipitating one or more metal compounds from solution using an alkaline precipitant,
   (ii) aging the precipitated composition in a pulse-flow reactor,
   (iii) removing carbon dioxide from the pulse-flow reactor, and
   (iv) recovering and drying the aged composition,
      wherein the pulse-flow reactor is in the form of an elongate vessel having:
      (i) one or more inlets for introducing a slurry of the precipitated composition located at one end of the reaction vessel,
      (ii) a first outlet for removing the aged composition located at the opposite end of the vessel and a second outlet for removing carbon dioxide located at the opposite end of the vessel,
      (iii) means for imposing on the slurry a pulsatile oscillatory motion in a direction substantially parallel to the direction of the fluid flow,
      (iv) a plurality of stationary baffles mounted substantially transversely to the direction of fluid flow, and an un-baffled disengagement portion adjacent the first and second outlet.

2. A process according to claim 1 wherein the precipitated metal compounds comprise compounds of one or more metals selected from the group consisting of Ca, Mg, Ti, V, Cr, Mn, Fe, Cr, Co, Ni, Cu, Zn and Pb.

3. A process according to claim 1 wherein the precipitated metal compounds comprise compounds of one or more metals selected from the group consisting of Co, Ni, Cu and Fe.

4. A process according to claim 1 wherein the precipitated metal compounds comprise compounds of Cu, Zn and Mg.

5. A process according to claim 1 wherein a metal oxide thermostabilising material is present during the precipitation of the metal compounds.

6. A process according to claim 1 wherein an alumina sol is present during the precipitation of the metal compounds.

7. A process according to claim 1 wherein the alkaline precipitant comprises an alkaline carbonate.

8. A process according to claim 1 wherein the alkaline precipitant comprises an alkali metal carbonate.

9. A process according to claim 1 wherein the pulse-flow reactor comprises a single straight section or a plurality of straight sections joined by U-bends.

10. A process according to claim 1 wherein the pulse-flow reactor is in a horizontal orientation or a vertical orientation.

11. A process according to claim 1 wherein the internal cross-sectional area of the reactor taken up by each baffle is the same or different along the length of the reactor and is 20-80% of the total area.

12. A process according to claim 1 wherein when reactor is of circular cross-section, the baffles are discs having one central orifice through which the slurry may pass or comprise several orifices, or the discs are imperforate and have a smaller diameter than the internal diameter of the vessel thus leaving an annular space around their periphery.

13. A process according to claim 1 wherein ≥5 baffles are present in the reactor.

14. A process according to claim 1 wherein the pulsatile flow is provided by continuously pumping the slurry along the vessel using a centrifugal, diaphragm or gear pump and superimposing reciprocating oscillations by using suitable pumps, valves or other mechanisms such as a piston located so as to constitute an end wall of the reactor, or in hydraulic communication with an end of the reactor.

15. A process according to claim 1 wherein the oscillation frequency is in the range 0.1-10 Hz.

16. A process according to claim 1 wherein the amplitude of the oscillation is in the range 0.05-0.5 times the diameter of the reactor.

17. A process according to claim 1, wherein the aging step is performed at a temperature in the range 0 to 100° C.

18. A process according to claim 1 further comprising a step of calcining the catalyst composition.

19. A process according to claim 3 further comprising a step of reducing the catalyst composition.

20. A process according to claim 1 wherein the precipitating step occurs in the presence of a thermostabilising material.

21. A process according to claim 8 wherein the alkali metal carbonate is sodium carbonate or potassium carbonate.

22. A process according to claim 1, further comprising using the carbon dioxide removed from the pulse-flow reactor to prepare the alkaline prepare a metal carbonate precipitant.

* * * * *